Jan. 12, 1954 J. A. RAJCHMAN ET AL 2,666,151

MAGNETIC SWITCHING DEVICE

Filed Nov. 28, 1952 2 Sheets-Sheet 1

INVENTORS
JAN A. RAJCHMAN &
RAYMOND STUART WILLIAMS
BY Morris A. Rabkin
ATTORNEY Jan. 12, 1954 J. A. RAJCHMAN ET AL 2,666,151

MAGNETIC SWITCHING DEVICE

Filed Nov. 28, 1952 2 Sheets-Sheet 2

INVENTORS
JAN A. RAJCHMAN &
RAYMOND STUART WILLIAMS
BY Morris A. Kahn
ATTORNEY

Patented Jan. 12, 1954 2,666,151

UNITED STATES PATENT OFFICE 2,666,151

MAGNETIC SWITCHING DEVICE

Jan A. Rajchman and Raymond Stuart-Williams, Princeton, N. J., assignors to Radio Corporation of America, a corporation of Delaware Application November 28, 1952, Serial No. 322,973

8 Claims. (Cl. 307—88)

Figure 1:
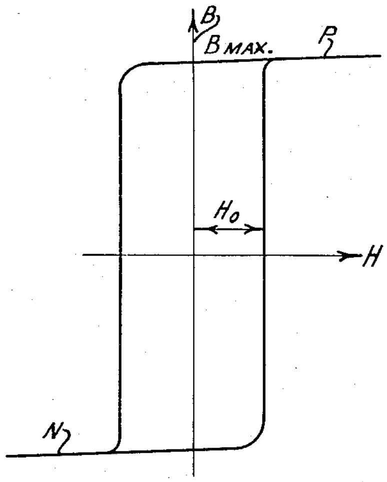

This invention relates to magnetic switching devices and more particularly to improvements in magnetic switching systems.

The application of magnetic materials in the field of computers appears to be an ever increasing one. The advantages of the use of magnets for data storage for switching purposes, as well as for delay line purposes, are coming into greater prominence as research is being applied to improvements in the materials of the magnets themselves, as well as their attendant circuitry. A memory device employing magnets may be found described in an article by Jay W. Forrester, in the Journal of Applied Physics, January 1951, page 44, entitled "Digital information storage in three dimensions using magnetic cores." Another article describing magnetic memories as well as switching circuits is found in the RCA Review for June 1952, volume XIII, No. 2, by J. A. Rajchman. The article is entitled "Static magnetic matrix memory and switching circuits." These descriptions all refer to the material of the magnetic cores or toroids being used as having a substantially rectangular hysteresis loop. From the descriptions in these articles it will be appreciated that with this type of magnetic characteristic, a certain minimum critical amount of magnetomotive force must be applied to a magnetic core to drive it from saturation in one polarity to saturation in the opposite polarity. The application of less than this force may change the saturation slightly, but will not cause a drive to magnetic saturation of the opposite polarity. Windings are placed upon a plurality of cores in such fashion that for selection, excitation is applied to the windings so that only a desired core receives a magnetomotive force in excess of such critical value, whereas the remaining cores receive magnetomotive forces of varying amounts which are less than this critical value. Accordingly, the remaining cores are unaffected by the selection of the desired core. The magnetic switches and/or memories may be arranged in rows and columns of cores. Each row of cores has a separate row coil inductively coupled to all the cores. Each column of cores has a separate column coil inductively coupled to the cores in each column. By exciting one row coil and one column coil, only the core coupled to both excited coils receives the magnetomotive force in excess of the required critical value. The other cores coupled to the excited coils receive magnetomotive forces less than the required critical value. Each core has an output coil coupled thereto. As a core is turned over, an output voltage is induced in the output coil. This may be utilized in any desired fashion. Means are usually provided to restore each core to its starting condition, so that the selecting drive is made with currents in one direction only. There will also be found described in the article by Rajchman a magnetic switch which consists of a plurality of cores with a number of coils connected to the cores inductively. The code of the coupling to the cores, for purposes of illustration, may be a binary one, the sense of the windings on the cores being in accordance with a desired binary code. Excitation of the coils coupled to the cores results in only one of the cores receiving a sufficiently great magnetomotive force. The remaining cores receive magnetomotive forces of lesser amplitudes by virtue of the fact that the sense of the excited windings oppose each other. Only the selected core has all the windings upon it in one sense excited.

These structures may be found described in detail and claimed in an application by this inventor, Serial No. 187,733, filed on September 30, 1950, for "Magnetic Matrix Memory"; also, in an application for a "Static Magnetic Matrix Memory," filed by this inventor, bearing Serial No. 264,217, filed December 29, 1951; also, see "Magnetic Matrix and Computing Devices," filed March 8, 1952, Serial No. 275,622 by this inventor.

The materials available for use in the memories and switches do have substantially rectangular hysteresis characteristics. However, these materials are expensive. Certain metallic materials have been manufactured in which the saturation flux density is high, and the coercive force is low. Although these materials have desirable characteristics, they are expensive and will not operate at very high frequencies. Ferrospinel materials have also been manufactured with rectangular hysteresis characteristics, and although they are cheap, and will operate rapidly, the coercive force required is very large and consequently large driving currents are required. There are available inexpensive magnetic materials which have a low coercive force but do not have rectangular magnetic characteristics.

It is, accordingly, an object of this invention to provide a switch construction which uses inexpensive materials.

It is a further object of the present invention to provide a magnetic switch construction which is economical to operate.

It is still a further object of the present invention to provide a novel magnetic switch construction which utilizes cheap magnetic core material.

These and other objects of the invention are achieved by utilizing core materials which are cheap to manufacture, and which have an S-shaped hysteresis characteristic curve. In place of the single core construction in the magnetic switches heretofore described, the cores are arranged in pairs. The cores all are selected to have substantially the same magnetic characteristics. Two D.-C. windings are used. One magnetic winding is coupled to one of the cores of each pair and functions to bias them at one point on their hysteresis curve. The other biasing winding is coupled to all the remaining cores of each pair and serves to bias them at a second point on their hysteresis curve. An output winding is coupled to each core in a pair in a sense which is appository. The characteristics of the materials as previously indicated are selected to be similar. The points on the characteristic curves chosen are such that when magnetomotive forces are applied to the cores which have an amplitude less than that required for saturation, both cores shift a certain amount along their characteristic curve, causing an equal flux change and inducing equal but opposite voltages in the output windings. When the selecting magnetomotive forces are in excess of the critical value required, then one core of the pair is driven well into a saturation. The other core of the pair is driven from saturation in one polarity to saturation in the other polarity and accordingly a large output voltage is induced in the output winding.

Figure 2:
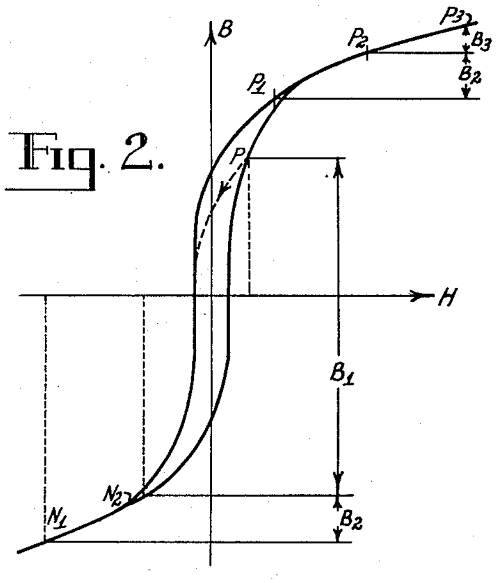
Figure 3:
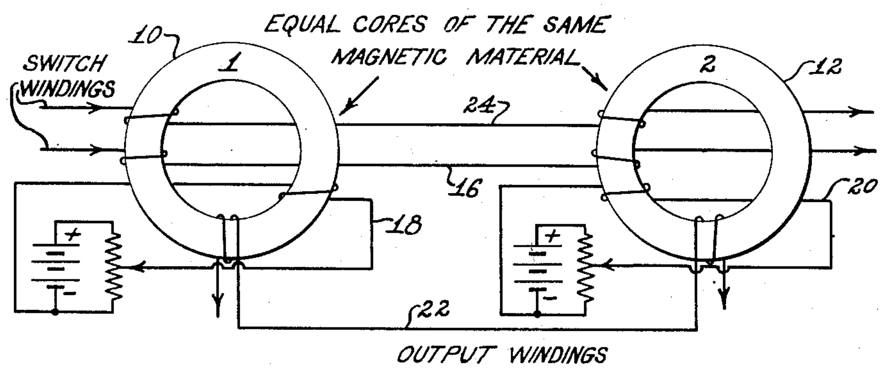
Figure 4:
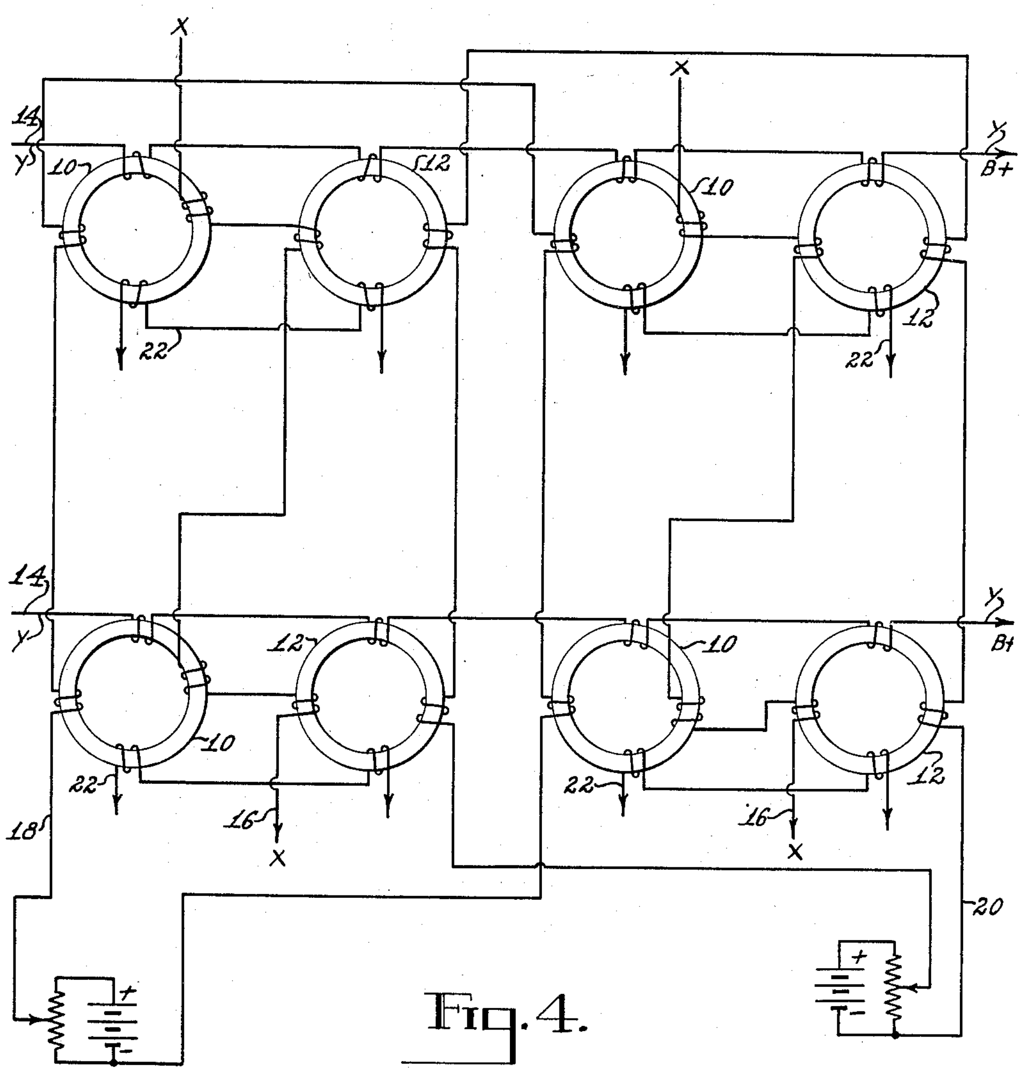

The novel features of the invention, as well as the invention itself, both as to its organization and method of operation, will best be understood from the following description when read in connection with the accompanying drawings, in which Figure 1 is a curve of a substantially rectangular, ideal magnetic characteristic, Figure 2 is a curve of the magnetic characteristics of the materials which may be used in accordance with the present invention, Figure 3 represents a schematic diagram of a unit which may be employed in a magnetic switch which is an embodiment of the present invention, and Figure 4 is an illustration of a schematic diagram showing how the present invention may be embodied in a magnetic matrix memory.

Referring now to Fig. 1, there is represented a hysteresis curve of materials which are ideally suited for utilization in magnetic switches and/or memories. It will be seen from the curve that a critical coercive $\pm H_0$ force is required to drive a magnetic core from saturation in one polarity to the opposite saturation. If a magnetic core is saturated at point N or P on the curve, a magnetomotive force less than $\pm H_0$ will leave the core saturated in condition N or P. There will be substantially no output voltage induced in an output coil coupled to such a core since only a very small flux change occurs. A magnetomotive force in excess of $H_0$ will cause the core to be readily driven to condition P on the curve and thereby be saturated with a polarity in the opposite direction. Core materials having these rectangular characteristics are expensive and usually have a high coercive force, thereby requiring high driving currents to effectuate a polarity turnover.

The core materials having a hysteresis characteristic of the type shown in Fig. 2 are relatively inexpensive and plentiful. However, the application of a magnetomotive force to core materials having this characteristic causes these core materials to change their flux conditions in accordance with the curve shown in Fig. 2. Therefore, even small coercive force applied to these core materials can cause these materials to change their condition of saturation and will cause a voltage to be induced in any output coil coupled thereto. To use materials having this S-shaped characteristic for switches without other compensations would not be very feasible.

Fig. 3 shows a schematic diagram of a switch unit which is an embodiment of the present invention in which compensation is made for the non-rectangular magnetic characteristics of the material and thus permits the employment of these relatively inexpensive and plentiful core materials. Two toroidal cores 10, 12 are shown. These comprise a basic unit. Two selecting windings 14, 16 are shown passing through the cores and inductively coupled to both cores by means of windings having the same winding sense. The coupling windings shown have only one turn, but of course as many turns as are required may be made. A separate magnetic bias coil 18, 20 is coupled to each core. An output coil 22 is coupled to both cores, but with a winding having an opposite sense on each core. Direct current is applied to the first of the two bias windings 18 from a source of direct current 24 to bias the core 10 to which it is coupled at point $N_1$ on the hysteresis curve shown in Fig. 2. Direct current is applied to the second magnetic bias coil 22 from a direct current source 26 to bias the second core 12 of the pair at point $P_1$ on the hysteresis curve shown in Fig. 2. The amplitude of the current applied to the switching or selecting coils 14, 16 is such that both windings must be excited to provide a sufficient magnetomotive force to drive a core from polarity N to polarity P. The excitation of one winding only does not provide a sufficient magnetomotive force. The excitation of one of the selecting coils causes the first core to be moved along the hysteresis curve from condition $N_1$ to point $N_2$. The second core is moved from point $P_1$ to point $P_2$ at the same time.

Consider the total flux change by the two cores being moved as a result of driving current through only one of the selecting coils. As seen in Fig. 2, the total flux change is substantially the same, and accordingly, equal and opposite voltages will be induced in the output winding. However, when both selecting coils are simultaneously excited, the first core can be driven all the way to point P on the characteristic curve while the second core is driven to point $P_3$. The flux change of the first core equivalent to $B_1$ far exceeds the flux change of the second core and accordingly an output voltage is induced in the output winding. Although this voltage may be less than that obtainable with a single core system, it is still sufficiently great for all required purposes. The system shown also has the advantage that no voltages are induced in the output winding when forces less than the critical one required are applied to the cores. This is an advantage, since the available magnetic materials do have sloping characteristics in their saturation regions. Upon removal of the driving currents, the pair of cores returns to those points on the hysteresis curve to which the D.-C. bias has been selected. The return path may be different, but the final resting place is essentially the same. Therefore, the requirement for a separate restoring winding is eliminated.

In application Serial No. 275,622 previously identified, there is shown, described and claimed a system for compensating for the sloping characteristics of the hysteresis curve of materials in their saturation regions. This consists of using two cores coupled to be simultaneously driven, yet having an output winding which is coupled to both in the opposing sense. One of the cores has a desirable substantially rectangular hysteresis characteristic. The other core has a hysteresis characteristic which is linear and has a slope which is opposite to the slope of the first core in the saturated region. Accordingly, when the cores are driven by magnetomotive forces less than the critical value, any change in flux of the first core is opposed by a flux change of the second core. This latter system, however, does not permit the use of as cheap and as plentiful materials, as does the present system described herein.

The total magnetomotive driving force of both selecting coils need not be sufficient to drive the first core all the way to saturation with the present system. All that is required of the drive is that it push the first core through a sufficient flux change, when both coils are excited, so that there is clearly an output obtained in the output winding. By this is meant that the drive applied to both cores pushes one of the cores from its end saturation region into a region of substantially little saturation. However, this drive causes a sufficient change in flux in the output coil coupled to this core so that the voltage induced in the output coil exceeds the voltage opposed to this which is induced as a result of the same drive being applied to the second core.

Figure 4 shows a circuit diagram of a portion of a magnetic switch arrayed as a matrix, which employs units of the present invention. Similar functioning apparatus has the same reference numerals applied. Only a 2 x 2 array is shown for the magnetic matrix. It will be readily appreciated that this can be expanded to the required matrix size. In place of the usual single core at each position in the magnetic matrix, pairs of cores 10, 12 are shown. Accordingly, in Fig. 4, four units using four pairs of cores are employed. On each pair of cores there are respectively coupled the following coils:

Row coils 14 are coupled to all the pairs of cores in a row by windings having the same sense. Column coils 16 are coupled to all the pairs of cores in a column by windings having the same sense. A separate output coil 22 is coupled to and associated with each pair of cores in the entire array. The coupling of each output coil to each core in each pair is by windings having an opposite sense. A first magnetic bias winding 18 is coupled to a first core 10 in each pair. A second magnetic bias winding 20 is coupled to all the second cores 12 of each pair. The amount of current to be applied to the magnetic bias windings is as follows:

Only a single coil, either row or column, is excited. Then, direct current is applied from the direct current source 24 to the first bias winding and another direct current is applied from the second direct current source 26 to the second bias winding until excitation of the pairs of cores by one selecting coil only provides substantially no voltage in the output or reading coil. Once this value is chosen for two coils of any pair, then, in view of the fact that the cores are selected to have substantially the same characteristics, this direct current selection need not be done further.

Operation of the magnetic switching matrix shown in Fig. 4 is substantially the same as that of the magnetic switches described in the above indicated references. Core selection is made by selecting a column coil and a row coil which are coupled to the desired core. The bias applied to the magnetic biasing windings does not require that a material have a linearly varying hysteresis characteristic in the near saturation regions, since varying the bias can determine the initial position from which equal and opposite voltages are induced in the output windings by an excitation of a row or column coil which is less than the critical value.

Although two-step selection is shown and described herein, it will be appreciated that more than two-step selection of the type described and claimed in application Serial No. 275,622, identified above, conceivably may be used. However, in the employment of more than two-step selection, the curves of the material should be substantially linear in the positive and negative saturation regions or as nearly so as possible. The reason for this is that if the increment of magnetization causes a change in flux of one of the cores greater than the change in flux of the other core, obviously there is no voltage cancellation occurring in the output winding. For increments of magnetization which are less than 3, the linearity of the characteristic curve is not too material; in excess of 3, it is desirable. However, if perfect compensation is not required, then obviously no problem is presented. When the driving magnetomotive forces are removed, the D.-C. magnetic biasing forces restore the cores to their initial condition respectively at $N_1$ and $P_1$. Thus the switch can be used again as soon as a selection is terminated.

There has been shown and described a novel, useful, and inexepensive construction for a magnetic switch which permits employment of materials having other than a rectangular hysteresis characteristic.

What is claimed is:

1. A magnetic switch comprising a plurality of pairs of cores of magnetic material having substantially similar hysteresis characteristics, a plurality of output coils, each inductively coupled to a different pair of cores by an oppositely sensed winding on each core in each pair, a plurality of selecting coils, each pair of cores being inductively coupled to a different two of said selecting coils, means to selectively apply current to two of said selecting coils to drive only the pair of cores coupled thereto to magnetic saturation having a desired polarity, means to apply a magnetic bias to one core of each of said pairs of cores to initially position said one core at a first point of its hysteresis characteristics, and means to apply a magnetic bias to the other of each of said pairs of cores to initially position said other core at a second point of its hysteresis characteristic, said first and second points being determined as the points from which magnetic excursions of each of said pairs of cores caused by excitation of only one of the coils coupled thereto to cause substantially equal voltages to be induced in the output winding coupled thereto.

2. A magnetic switch comprising a plurality of pairs of cores of magnetic material having substantially similar hysteresis characteristics, a plurality of output coils, each inductively coupled to a different pair of cores by oppositely sensed windings, a plurality of selecting coils, each pair of cores being inductively coupled to a different two of said selecting coils, means to selectively apply current to two of said selecting coils to drive only the pair of cores coupled thereto toward magnetic saturation having a desired polarity, means to bias each of said pairs of cores magnetically to provide voltage cancellation in the coupled output coil for magnetic excursions caused by excitation of only one of a pair of selecting coils.

3. A magnetic switch as recited in claim 1 wherein both said means to apply a magnetic bias include a coil winding on each core and means to apply direct current to said coil winding in an amount required to provide the proper magnetic bias.

4. A magnetic switch comprising a plurality of pairs of cores of magnetic material having substantially similar hysteresis characteristics, said plurality of pairs of cores being arranged in a matrix of columns and rows, a plurality of row coils each of which is inductively coupled to a different one of said rows of cores, a plurality of column coils each of which is inductively coupled to a different one of said columns of cores, a plurality of output coils each coupled to and associated with a different pair of said plurality of pairs of cores, the sense of said coupling being opposite on each core of a core pair, means to selectively excite a desired one of said row coils and a desired one of said column coils to drive to saturation only the pair of cores coupled thereto, and means to magnetically bias each of the cores in every pair of cores to substantially cause a voltage cancellation in the associated output coils of those of the pairs of cores which receive a drive from an excited row coil only or from an excited column coil only, but not from both excited coils together.

5. A magnetic switch comprising a plurality of pairs of cores of magnetic material having substantially similar hysteresis characteristics, said plurality of pairs of cores being arranged in a matrix of columns and rows, a plurality of row coils each of which is inductively coupled to a different one of said rows of cores, a plurality of column coils each of which is inductively coupled to a different one of said columns of cores, a plurality of output coils each of which is coupled to a different pair of said plurality of pairs of cores, the sense of said coupling being opposite on each core pair, means to selectively excite a desired one of said row coils and a desired one of said column coils to drive to saturation only the pair of cores coupled thereto, means to magnetically bias one of the cores in every pair of cores to position said one core in the absence of excitation at one point of its hysteresis characteristic, means to magnetically bias the other cores of every pair of cores to position said other cores in the absence of excitation at a second point of its hysteresis characteristic, said first and second points being determined as the points from which magnetic excursions of each pair of cores caused by excitation of either row or column coil alone cause substantially equal voltages to be induced in said output coil.

6. A magnetic switch as recited in claim 5 wherein said means to bias one of the cores in every pair comprises a first bias coil inductively coupled to each said one core in every pair, and means to apply direct current to said first bias coil, and wherein said means to bias the other of the cores in every pair comprises a second bias coil inductively coupled to each said other core in every pair, and means to apply direct current to said second bias coil.

7. A magnetic switch comprising a plurality of pairs of cores of magnetic material having substantially similar hysteresis characteristics, a plurality of output coils, each inductively coupled to a different pair of cores by oppositely sensed windings, means to selectively apply one or more increments of magnetomotive force to said cores, a coincidence in several of said increments being applied to a core pair driving them substantially toward saturation having a desired polarity, and means to magnetically bias each of the cores in every pair of cores to substantially provide an induced voltage cancellation in the output coil coupled thereto by the application of fewer magnetomotive force increments than required to drive both cores substantially toward saturation.

8. A magnetic switch including a pair of cores of magnetic material each having substantially the same magnetic characteristic, at least two switching windings inductively coupled to said cores, means to separately and simultaneously excite said switching windings, an output winding coupled to both cores, the sense of the coupling on one core being opposite to the sense of the winding on the other core, a first magnetic bias winding, a second magnetic bias winding, and means to respectively apply a direct current to said first and second magnetic bias windings to magnetically bias said cores to those portions of their magnetic characteristics to provide substantially no resultant output in said output winding when said switching windings are separately excited and to provide a resultant output where said switching windings are simultaneously excited.

JAN A. RAJCHMAN.
RAYMOND STUART-WILLIAMS.

No references cited.